(12) United States Patent
Amari

(10) Patent No.: US 11,376,989 B2
(45) Date of Patent: Jul. 5, 2022

(54) INFORMATION PROCESSING APPARATUS AND METHOD FOR BIDIRECTIONAL TRANSMISSION OF ELECTRIC POWER BETWEEN ELECTRIC VEHICLE AND POWER SYSTEM

(71) Applicant: HONDA MOTOR CO., LTD., Tokyo (JP)

(72) Inventor: Yusaku Amari, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 127 days.

(21) Appl. No.: 16/882,907

(22) Filed: May 26, 2020

(65) Prior Publication Data
US 2020/0384883 A1 Dec. 10, 2020

(30) Foreign Application Priority Data
May 27, 2019 (JP) .............................. JP2019-098696

(51) Int. Cl.
*B60L 55/00* (2019.01)
*B60L 53/66* (2019.01)
*B60L 53/53* (2019.01)
*H04W 4/44* (2018.01)

(52) U.S. Cl.
CPC ............ *B60L 55/00* (2019.02); *B60L 53/53* (2019.02); *B60L 53/66* (2019.02); *H04W 4/44* (2018.02); *Y02T 90/12* (2013.01); *Y04S 10/126* (2013.01)

(58) Field of Classification Search
CPC .......... B60L 55/00; B60L 53/66; H04W 4/44; Y02T 90/12; Y04S 10/126
See application file for complete search history.

(56) References Cited

U.S. PATENT DOCUMENTS

| 6,555,991 | B1 * | 4/2003 | Zettel ................... | H02J 7/0016 320/137 |
| 7,110,728 | B2 * | 9/2006 | Mizui ..................... | G08G 1/20 340/425.5 |
| 7,778,746 | B2 * | 8/2010 | McLeod ................. | B60L 53/62 701/22 |

(Continued)

FOREIGN PATENT DOCUMENTS

| CN | 104380127 A | * 2/2015 | .............. B60L 53/00 |
| JP | 2010-022099 | 1/2010 | |

(Continued)

OTHER PUBLICATIONS

Japanese Office Action for Japanese Patent Application No. 2019-098696 dated Feb. 9, 2021.

*Primary Examiner* — Naum Levin
(74) *Attorney, Agent, or Firm* — Amin, Turocy & Watson, LLP

(57) ABSTRACT

An information processing apparatus includes an acquirer that is configured to acquire information regarding charging and discharging of a traveling battery provided in a vehicle with respect to an electric power system, and a communication controller that is configured to cause a communicator mounted on the vehicle to transmit the information acquired by the acquirer to a server apparatus in a case where a predefined condition associated with the type of the information is satisfied.

8 Claims, 4 Drawing Sheets

(56) References Cited

U.S. PATENT DOCUMENTS

| | | | | |
|---|---|---|---|---|
| 7,844,370 | B2* | 11/2010 | Pollack | B60L 55/00 700/291 |
| 8,255,537 | B2* | 8/2012 | Hamada | G08G 1/161 709/226 |
| 8,314,587 | B2* | 11/2012 | White | B60L 53/305 320/103 |
| 8,359,132 | B2* | 1/2013 | Laberteaux | H02J 7/00716 701/22 |
| 8,509,976 | B2* | 8/2013 | Kempton | B60L 53/305 701/22 |
| 8,796,881 | B2* | 8/2014 | Davis | B60L 53/65 307/69 |
| 8,989,954 | B1* | 3/2015 | Addepalli | H04W 8/06 701/32.3 |
| 9,024,580 | B2* | 5/2015 | Wu | B60L 53/65 320/109 |
| 9,637,003 | B2* | 5/2017 | Leonard | B60L 53/305 |
| 9,705,333 | B2* | 7/2017 | Clifton | H02J 3/32 |
| 9,731,615 | B2* | 8/2017 | Uyeki | B60L 53/63 |
| 9,883,440 | B2* | 1/2018 | Zembutsu | H04W 36/12 |
| 10,090,567 | B2* | 10/2018 | Austin | B60L 53/63 |
| 10,389,141 | B2* | 8/2019 | Roumi | H02J 7/0021 |
| 10,485,013 | B2* | 11/2019 | Lee | H04L 5/0094 |
| 10,681,613 | B2* | 6/2020 | Silver | G08G 1/0965 |
| 10,710,460 | B2* | 7/2020 | Beer | H02J 7/0047 |
| 11,010,489 | B2* | 5/2021 | Palukuru | G06F 1/3278 |
| 2006/0187821 | A1* | 8/2006 | Watanabe | H04L 63/1458 370/229 |
| 2006/0250902 | A1* | 11/2006 | Bender | B60L 15/007 369/1 |
| 2008/0039979 | A1* | 2/2008 | Bridges | B60L 53/65 700/292 |
| 2014/0266061 | A1* | 9/2014 | Wachal | H02J 7/00036 320/134 |
| 2015/0084601 | A1* | 3/2015 | Hing | B60L 53/11 320/132 |
| 2019/0275894 | A1* | 9/2019 | Amacker | B60L 53/665 |
| 2019/0288347 | A1 | 9/2019 | Yokoyama et al. | |
| 2019/0313279 | A1* | 10/2019 | Li | H04W 28/0289 |
| 2020/0059946 | A1* | 2/2020 | Lee | H04L 5/0094 |
| 2020/0244081 | A1* | 7/2020 | Kanamori | H02J 3/322 |
| 2021/0116917 | A1* | 4/2021 | Hirose | B60W 40/08 |
| 2021/0286009 | A1* | 9/2021 | Kajitani | G01R 31/396 |
| 2021/0336471 | A1* | 10/2021 | Leatherdale | G01R 31/396 |

FOREIGN PATENT DOCUMENTS

| | | | | |
|---|---|---|---|---|
| JP | 2011-055689 | | 3/2011 | |
| JP | 2017-134571 | | 8/2017 | |
| JP | 6402256 | B2 * | 10/2018 | ......... B60L 11/1842 |
| JP | 2019-079346 | | 5/2019 | |
| JP | 2019216537 | A * | 12/2019 | |
| JP | 2019219275 | A * | 12/2019 | |
| WO | WO-2017038753 | A1 * | 3/2017 | ......... B60L 11/1842 |
| WO | 2018/084152 | | 5/2018 | |
| WO | WO-2019181729 | A1 * | 9/2019 | ........... G01R 31/367 |

* cited by examiner

| CONDITION | VEHICLE INFORMATION |
|---|---|
| PREDETERMINED TIME HAS ELAPSED (CONDITION 1) | (1) VIN, (2) CHARGING TIME, (3) DISCHARGING TIME, (4) TRAVELING TIME, (5) TIME FOR LINKING TO V2G, (6) NUMBER OF TIMES OF STARTUP |
| TIME FOR LINKING TO V2G REACHES LINKING LIMIT THRESHOLD VALUE (CONDITION 2) | (1) VIN, (2) CHARGING TIME, (4) TRAVELING TIME, (6) NUMBER OF TIMES OF STARTUP |
| NUMBER OF TIMES OF CHARGING REACHES THRESHOLD VALUE FOR NUMBER OF TIMES OF CHARGING (CONDITION 3) | |
| VEHICLE M PARTICIPATES IN V2G (CONDITION 4) | (1) VIN, (3) DISCHARGING TIME, (5) TIME FOR LINKING TO V2G, (6) NUMBER OF TIMES OF STARTUP, (7) VEHICLE SOC, (8) CHARGING/DISCHARGING PERFORMANCE |
| VEHICLE IS PRESENT AT SPECIFIC POSITION (CONDITION 5) | (4) TRAVELING TIME, (6) NUMBER OF TIMES OF STARTUP, (9) POSITION INFORMATION |
| SUM TOTAL OF CHARGING TIME AND DISCHARGING TIME REACHES FIRST THRESHOLD VALUE (CONDITION 6) | (1) VIN, (2) CHARGING TIME, (6) NUMBER OF TIMES OF STARTUP |
| ELAPSED TIME FROM STARTING OF CHARGING REACHES SECOND THRESHOLD VALUE (CONDITION 7) | |
| VEHICLE IS TRAVELING (CONDITION 8) | (1) VIN, (2) CHARGING TIME, (6) NUMBER OF TIMES OF STARTUP, (9) POSITION INFORMATION |

| PROHIBITION CONDITION |
|---|
| TOTAL CHARGING TIME IS NOT EQUAL TO OR LESS THAN CHARGEABLE TIME OF TRAVELING BATTERY (CONDITION 9) |

INFORMATION PROCESSING APPARATUS AND METHOD FOR BIDIRECTIONAL TRANSMISSION OF ELECTRIC POWER BETWEEN ELECTRIC VEHICLE AND POWER SYSTEM

CROSS-REFERENCE TO RELATED APPLICATION

Priority is claimed on Japanese Patent Application No. 2019-098696, filed May 27, 2019, the content of which is incorporated herein by reference.

BACKGROUND

Field

The present invention relates to an information processing apparatus, an information processing method, and a storage medium.

Description of Related Art

In recent years, electrified vehicles have come to be widely used. Electrified vehicles are mounted with a traveling battery (for example, a secondary battery), accumulate electricity in the traveling battery, and travel by supplying electric power to a motor from the traveling battery during traveling. Thus, a user of an electrified vehicle accumulates electricity in the traveling battery of the electrified vehicle, for example, at charging stations provided at various locations or at a home of the user.

A social system called vehicle to grid (V2G) has been proposed. In the V2G, electric power is interchanged between an electric power system including a commercial electric power network and electrified vehicles (see PCT International Publication No. WO2018/084152). In the V2G, when an electrified vehicle is not used as moving means, a traveling battery mounted on the electrified vehicle is used like one of electric power storage facilities in a commercial electric power network. Thus, electric power is transmitted and received in a bidirectional manner between an electrified vehicle and an electric power system that participate in the V2G (PCT International Publication No. WO2018/084152).

SUMMARY

Here, an aggregator that performs adjustment related to transmission and reception of electric power acquires, from a vehicle participating in the V2G, information regarding the vehicle and information regarding a traveling battery mounted on the vehicle via a wireless communication network such as a cellular network, and controls transmission and reception of electric power in the V2G on the basis of the acquired information. However, in a case where vehicles participating in the V2G transmit information in a simultaneous manner, a network may become overloaded.

The present invention has been made in consideration of these circumstances, and one object thereof is to provide an information processing apparatus, an information processing method, and a storage medium capable of preventing a network from being overloaded through communication related to charging and discharging of a traveling battery.

The information processing apparatus, the information processing method, and the storage medium according to the present invention employ the following configurations.

(1): According to an aspect of the embodiment, an information processing apparatus is provided including an acquirer that is configured to acquire information regarding charging and discharging of a traveling battery provided in a vehicle with respect to an electric power system; and a communication controller that is configured to cause a communicator mounted on the vehicle to transmit the information acquired by the acquirer to a server apparatus in a case where a predefined condition associated with the type of the information is satisfied.

(2): In the aspect of the above (1), in the information processing apparatus, the predefined condition for a discharging time and a charging time that are the types of the information involves satisfying at least one of a sum total of the discharging time for which the traveling battery releases electric power to the electric power system and the charging time for which the traveling battery is charged with electric power from the electric power system reaching a first threshold value, and an elapsed time after the traveling battery starts to be charged with electric power from the electric power system reaching a second threshold value.

(3): In the aspect of the above (1) or (2), the predefined condition for the number of times of charging of the traveling battery that is the type of the information is that the number of times reaches a third threshold value.

(4): In any one of the aspects of the above (1) to (3), the communication controller is configured to set values of a discharging time and a charging time to initial values in a case where the communicator is caused to transmit the information on the basis of the fact of satisfying the condition that a sum total of the discharging time for which the traveling battery releases electric power to the electric power system and the charging time for which the traveling battery is charged with electric power from the electric power system reaches a first threshold value.

(5): In any one of the aspects of the above (1) to (4), the predefined condition for a charging time that is the type of the information is that a sum total of the charging time is equal to or less than a chargeable time of the traveling battery, and the communication controller is configured to cause the communicator not to transmit the information in a case where the condition that the sum total is equal to or less than the chargeable time of the traveling battery is not satisfied.

(6): In any one of the aspects of the above (1) to (5), the type of the information transmitted to the server apparatus by the communication controller in a case where the condition is satisfied differs depending on each satisfied condition.

(7): According to another aspect of the embodiment, an information processing method is provided for causing a computer to acquire information regarding charging and discharging of a traveling battery provided in a vehicle with respect to an electric power system; and transmit the information to a server apparatus by using a communicator mounted on the vehicle in a case where a predefined condition associated with the type of the information is satisfied.

(8): According to still another aspect of the embodiment, a storage medium is provided for storing a program causing a computer to acquire information regarding charging and discharging of a traveling battery provided in a vehicle with respect to an electric power system; and transmit the information to a server apparatus by using a communicator mounted on the vehicle in a case where a predefined condition associated with the type of the information is satisfied.

According to (1) to (8), it is possible to prevent a network from being overloaded due to communication related to charging and discharging of the traveling battery.

According to (2) and (3), it is possible to prevent deterioration in the traveling battery.

According to (5), in a case where the traveling battery deteriorates, it is possible to prevent further deterioration in the traveling battery due to V2G.

According to (6), it is possible to further prevent a network from being overloaded due to communication related to charging and discharging of the traveling battery.

BRIEF DESCRIPTION OF THE DRAWINGS

FIG. 3 is a diagram showing an example of a content of transmission condition information.

FIG. 4 is a diagram showing an example of a content of transmission prohibition condition information.

DETAILED DESCRIPTION

Hereinafter, with reference to the drawings, an information processing apparatus, an information processing method, and a storage medium according to an embodiment of the present invention will be described.

Outline of V2G System

Figure 1:
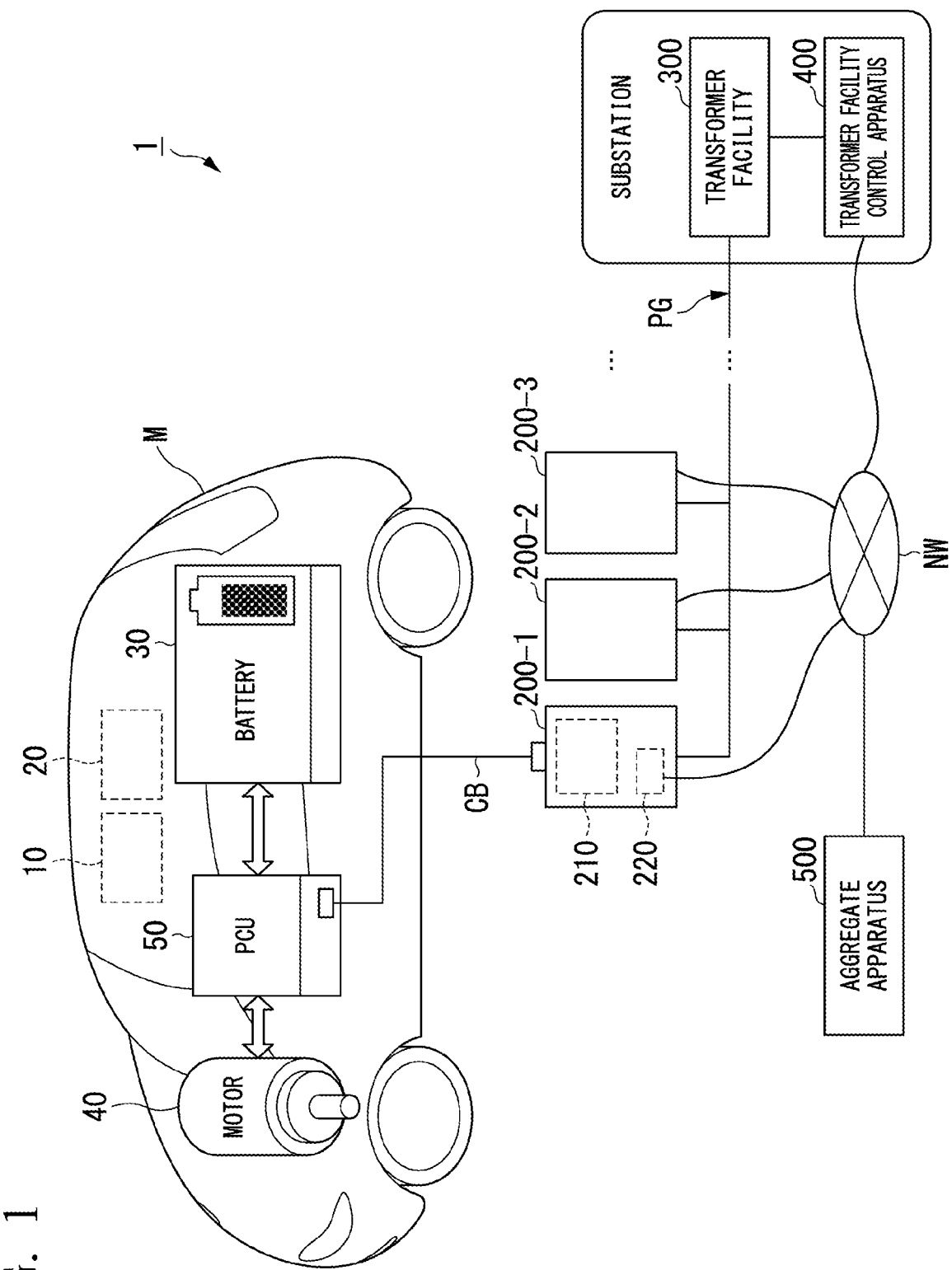
FIG. 1 is a diagram showing an outline of a V2G system using an information processing apparatus of the present embodiment.

First, a description will be made of an outline of a vehicle to grid (V2G) system 1. FIG. 1 is a diagram showing an outline of the V2G system 1 using an information processing apparatus 10 of the present embodiment. The V2G system 1 is a system in which a traveling battery mounted on an electric vehicle is linked to an electric power system and electric power is interchanged between the vehicle and the electric power system. The V2G system 1 includes one or more vehicles M provided with the information processing apparatus 10, one or more external power source apparatuses 200 (shown external power source apparatuses 200-1, 200-2, 200-3, . . . ), a transformer facility 300, a transformer facility control apparatus 400, and an aggregate apparatus 500. The information processing apparatus 10, the external power source apparatus 200, the transformer facility control apparatus 400, and the aggregate apparatus 500 may perform communication with each other via a network NW. The network NW includes, for example, a cellular network, a Wi-Fi network, the Internet, a wide area network (WAN), a local area network (LAN), a public line, a provider apparatus, a dedicated line, and a radio base station. The constituent elements may perform direct wireless communication with each other without using the network NW.

The vehicle M includes, for example, the information processing apparatus 10, a vehicle control apparatus 20, a traveling battery 30, a motor 40, and a power control unit (PCU) 50. The vehicle M is, for example, a vehicle that drives the motor 40 by using electric power supplied from the mounted traveling battery 30 and travels by applying a driving force from the motor 40 to drive wheels. The vehicle M is, for example, a traveling electric vehicle, or a so-called hybrid vehicle including an engine and a motor.

The motor 40 is, for example, a three-phase AC motor. The PCU 50 converts a DC voltage supplied from the traveling battery 30 into an AC voltage that is then supplied to the motor 40 under the control of the vehicle control apparatus 20. Under the control of the vehicle control apparatus 20, the PCU 50 converts a DC voltage supplied from the external power source apparatus 200 into a DC voltage with a level that can charge the traveling battery 30, and thus charges the traveling battery 30. The PCU 50 converts a DC voltage released from the traveling battery 30 into a DC voltage with a level that can be input to the external power source apparatus 200 and supplies the DC voltage to the external power source apparatus 200.

The vehicle M may be an autonomous driving vehicle. In this case, the vehicle control apparatus 20 executes driving control, for example, by autonomously controlling one or both of steering and speed changing of the vehicle on the basis of surrounding environments of the vehicle M recognized by using detection results from detection functional units (not shown) of the vehicle M.

The external power source apparatuses 200 are linked to an electric power system PG. The external power source apparatus 200 and the PCU 50 of the vehicle M are connected to each other via a cable CB while the vehicle M is stopped. Consequently, transmission and reception of electric power are possible between the vehicle M and the cable CB. The external power source apparatus 200 includes a controller 210 and a communicator 220. The controller 210 accumulates electric power supplied from the electric power system PG in the traveling battery 30 of the vehicle M or supplies electric power released from the traveling battery 30 to the electric power system PG in response to an instruction received from the aggregate apparatus 500 via the communicator 220.

The transformer facility 300 is provided in a substation (including a substation for distribution), and transforms (for example, steps down) a voltage of electric power generated at a power plant or electric power supplied from another substation, and supplies (distributes) the electric power to the electric power system PG. The transformer facility control apparatus 400 derives a power amount to be supplied to the electric power system PG on the basis of various pieces of information and controls the transformer facility 300 to supply the derived power amount to the electric power system PG. The various pieces of information are, for example, weather information, a climate, and a calendar.

The aggregate apparatus 500 determines, for example, an action requested of the vehicle M participating in the V2G on the basis of information (hereinafter, power supply status information) regarding a power supply status in the electric power system PG, received from the transformer facility control apparatus 400, and information (hereinafter, vehicle information) regarding charging and discharging of the electric power system PG, received from the vehicle M participating in the V2G.

The aggregate apparatus 500 refers to, for example, the power supply status information and the vehicle information. In a case where the power supply status information indicates that electric power is in surplus in the electric power system PG, the aggregate apparatus 500 requests the vehicle M to consume the surplus electric power by charging the traveling battery 30. In a case where the power supply status information indicates that electric power is insufficient in the electric power system PG, the aggregate apparatus 500 requests the vehicle M to supply the insufficient electric power by discharging the traveling battery 30.

Specifically, the aggregate apparatus 500 instructs the vehicle control apparatus 20 of the vehicle M or an occupant of the vehicle M to move the vehicle M to the external power source apparatus 200 connected to a distribution system in which electric power is in surplus. In a case where the designated external power source apparatus 200 and the designated vehicle M are connected to each other via the cable CB, the aggregate apparatus 500 instructs the designated external power source apparatus 200 to accumulate the surplus electric power in the electric power system PG in the traveling battery 30 of the vehicle M. The aggregate apparatus 500 instructs the vehicle control apparatus 20 of the vehicle M or the occupant of the vehicle M to move the vehicle M to the external power source apparatus 200 connected to a distribution system in which electric power is insufficient. In a case where the designated external power source apparatus 200 and the designated vehicle M are connected to each other via the cable CB, the aggregate apparatus 500 instructs the designated external power source apparatus 200 to release the insufficient electric power in the electric power system PG from the traveling battery 30 of the vehicle M.

The aggregate apparatus 500 does not request the vehicle M to perform charging or discharging based on the V2G on the basis of, for example, the vehicle information, the vehicle M being a vehicle of which deterioration in the traveling battery 30 is in progress or a vehicle of which a state of the traveling battery 30 is not appropriate for charging and discharging.

In a case where the vehicles M participating in the V2G transmit vehicle information to the aggregate apparatus 500 in a simultaneous manner, the network NW may be overloaded. Therefore, preferably, the vehicles M participating in the V2G transmit the vehicle information to the aggregate apparatus 500 at respective appropriate timings such that the network NW is not overloaded. The information processing apparatus 10 of the present embodiment transmits the vehicle information to the aggregate apparatus 500 in a case where various conditions are satisfied.

Configuration of Information Processing Apparatus 10

Figure 2:
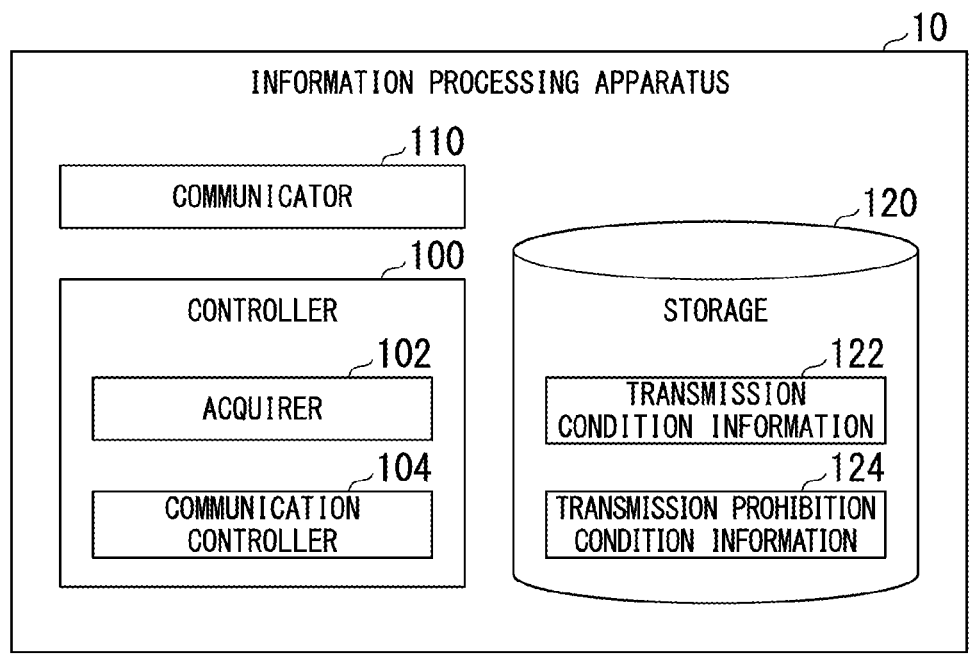
FIG. 2 is a diagram showing an example of a configuration of the information processing apparatus.

FIG. 2 is a diagram showing an example of a configuration of the information processing apparatus 10. The information processing apparatus 10 includes, for example, a controller 100, a communicator 110, and a storage 120. The information processing apparatus 10 may be realized as a part of a function of an electronic control unit (ECU) of the vehicle M controlling, for example, an internal combustion engine, a motor, and a transmission.

The controller 100 realizes each functional unit such as an acquirer 102 and a communication controller 104 by a processor such as a central processing unit (CPU) executing a program (software) stored in the storage 120. Some or all of the constituent elements may be realized by hardware (a circuit portion; including a circuitry) such as a large scale integration (LSI), an application specific integrated circuit (ASIC), a field-programmable gate array (FPGA), or a graphics processing unit (GPU), and may be realized by software and hardware in cooperation.

The communicator 110 performs communication with, for example, various apparatuses connected to the network NW in a wireless manner.

The storage 120 may be implemented by a storage device (a storage device provided with a non-transitory storage medium) such as a hard disk drive (HDD) or a flash memory, may be implemented by an attachable and detachable storage medium (non-transitory storage medium) such as a DVD or a CD-ROM, and may be a storage medium attached to a drive device. All or part of the storage 120 may be an external device such as an NAS or an external storage server that can be accessed by the information processing apparatus 10. In addition to the program, information such as transmission condition information 122 and transmission prohibition condition information 124 is stored in the storage 120. Details of each piece of the information will be described later.

The acquirer 102 acquires, for example, information regarding the vehicle M. The information regarding the vehicle M includes, for example, (1) a vehicle identification number (hereinafter, a VIN), (2) a charging time of the traveling battery 30, (3) a discharging time of the traveling battery 30, (4) a traveling time of the vehicle M, (5) a time for linking to the V2G, (6) the number of times of startup of the vehicle M, (7) a state of charge (hereinafter, referred to as a vehicle SOC) of the traveling battery 30, (8) charge/discharge performance of the traveling battery 30, (9) position information of the vehicle M, (10) consent to participation in the V2G, (11) the number of times of charging of the traveling battery 30, and (12) a charging elapsed time.

Acquisition of (1) VIN

A VIN is stored in, for example, a storage device DB (not shown) of the vehicle control apparatus 20, and the acquirer 102 acquires the VIN from the storage device DB.

Acquisition of (2) Charging Time and (3) Discharging Time

A charging time and a discharging time of the traveling battery 30 are counted by, for example, the vehicle control apparatus 20, and count results are stored in the storage device DB. For example, the vehicle control apparatus 20 identifies whether the traveling battery 30 is being charged or discharged on the basis of a detection result from a detector when the PCU 50 and the external power source apparatus 200 are connected to each other via the cable CB. The detector is a sensor detecting a direction of a current flowing through the PCU 50.

Specifically, the vehicle control apparatus 20 identifies that the traveling battery 30 is being discharged in a case where the detection result shows that a current is flowing out of the PCU 50 and identifies that the traveling battery 30 is being charged in a case where the detection result shows that a current is flowing into the PCU 50. In a case where the detection result shows that a current is not flowing into or flowing out of the PCU 50, the vehicle control apparatus 20 identifies that the traveling battery 30 is not being charged or discharged. The vehicle control apparatus 20 counts a time after the traveling battery 30 is identified to be being charged until the traveling battery 30 is identified to be not being charged or discharged as the charging time and counts a time after the traveling battery 30 is identified to be being discharged until the traveling battery 30 is identified to be not being charged or discharged as the discharging time. The acquirer 102 acquires the charging time and the discharging time stored in the storage device DB, for example, at a predetermined time interval.

In response to instructions from the communication controller 104 which will be described later, the vehicle control apparatus 20 stores (updates) a value obtained by adding a count value of the charging time to a charging time hitherto already stored in the storage device DB into the storage device DB as a new charging time and stores (updates) a value obtained by adding a count value of the discharging time to a discharging time hitherto already stored in the storage device DB into the storage device DB as a new discharging time, until a count is reset (set) to an initial value (for example, 0). Therefore, a charging time and a discharging time stored in the storage device DB are not limited to a time related to charging performed once or a time related to discharging performed once.

Acquisition of (4) Traveling Time

A traveling time is counted by, for example, the vehicle control apparatus 20, and a count result is stored in the storage device DB. The vehicle control apparatus 20 identifies that the vehicle M is traveling on the basis of, for example, a detection result from a detector that detects whether or not the drive wheels of the vehicle M are being driven. The vehicle control apparatus 20 counts a time after the vehicle M is identified to be traveling until the vehicle M is identified not to be traveling, as the traveling time. The vehicle control apparatus 20 stores (updates) a value obtained by adding the counted traveling time to a traveling time hitherto already stored in the storage device DB into the storage device DB as a new traveling time. The acquirer 102 acquires the traveling time stored in the storage device DB, for example, at a predetermined time interval.

Acquisition of (5) Time for Linking to V2G

For example, in response to an instruction from the aggregate apparatus 500, the vehicle control apparatus 20 counts a time (that is, a time for linking to the V2G) for which the PCU 50 is connected to the external power source apparatus 200 in order to accumulate surplus electric power in the electric power system PG in the traveling battery 30 or to release insufficient electric power in the electric power system PG from the traveling battery 30 and stores the counted time into the storage device DB. In a case where the vehicle M is an autonomous driving vehicle, the vehicle control apparatus 20 identifies whether the vehicle M is connected to the external power source apparatus 200 so as to be linked to the V2G, or the vehicle M is connected to the external power source apparatus 200 due to only charging or discharging being required for the vehicle M, in response to an instruction for linking to the V2G received from the aggregate apparatus 500. In a case where the vehicle M is not an autonomous driving vehicle, the vehicle control apparatus 20 identifies whether the vehicle M is connected to the external power source apparatus 200 so as to be linked to the V2G, or the vehicle M is connected to the external power source apparatus 200 due to only charging or discharging being required for the vehicle M, depending on whether or not an input operation indicating connection to the external power source apparatus 200 for the purpose of linking to the V2G is performed on a human machine interface (HMI) of the vehicle M by the occupant of the vehicle M. In a case of the connection for the purpose of linking to the V2G, a process related to acquisition of a time during charging or discharging is the same as the process related to the acquisition of a charging time and a discharging time, and thus a description thereof will not be repeated.

Acquisition of (6) Number of Times of Startup

The number of times of startup of the vehicle M is counted by, for example, the vehicle control apparatus 20, and a count result is stored in the storage device DB. The vehicle control apparatus 20 identifies that the vehicle M has been started up on the basis of, for example, detection results from a detector that detects an ON state of an ignition and an ON state of an accessory power source. When the vehicle M is identified as having been started up, the vehicle control apparatus 20 stores (updates) a value obtained by adding "1" to the number of times of startup hitherto already stored in the storage device DB, into the storage device DB as a new number of times of startup. The acquirer 102 acquires the number of times of startup stored in the storage device DB, for example, at a predetermined time interval.

Acquisition of (7) Vehicle SOC

A vehicle SOC is acquired by, for example, the vehicle control apparatus 20, and is stored in the storage device DB. The vehicle control apparatus 20 acquires, for example, a detection result from a detector detecting a state of charge of the traveling battery 30 as a vehicle SOC at a predetermined time interval and stores (updates) the acquired vehicle SOC into the storage device DB. The acquirer 102 acquires the vehicle SOC stored in the storage device DB, for example, at a predetermined time interval.

Acquisition of (8) Charging/Discharging Performance

Charging/discharging performance is acquired by, for example, the vehicle control apparatus 20 and is stored in the storage device DB. The vehicle control apparatus 20 identifies the discharging performance on the basis of a detection result from the detector detecting a direction of a current flowing through the PCU 50 and the vehicle SOC, for example, at the time of discharging of the traveling battery 30. For example, in a case where an amount of electric power that can be released from the traveling battery 30 is large or a time taken to release electric power is long, the vehicle control apparatus 20 identifies that the discharging performance is high. The vehicle control apparatus 20 identifies the charging performance on the basis of a detection result from the detector detecting a direction of a current flowing through the PCU 50 and the vehicle SOC, for example, at the time of charging of the traveling battery 30. For example, in a case where an amount of electric power that can be accumulated in the traveling battery 30 is large or a time taken to accumulate the amount of electric power is short, the vehicle control apparatus 20 identifies that the charging performance is high. For example, the vehicle control apparatus 20 identifies the charging performance of the traveling battery 30 at the time of charging of the traveling battery 30, identifies the discharging performance of the traveling battery 30 at the time of discharging of the traveling battery 30, and stores (updates) an index indicating the identified charging performance and an index indicating the identified discharging performance (that is, the index indicating the charging/discharging performance) into the storage device DB. The acquirer 102 acquires the charging/discharging performance stored in the storage device DB, for example, at a predetermined time interval.

Acquisition of (9) Position Information

Position information is acquired by, for example, the vehicle control apparatus 20, and is stored in the storage device DB. The vehicle control apparatus 20 identifies, for example, the current position of the vehicle M as position information on the basis of a signal received from a GNSS satellite by a global navigation satellite system (GNSS) receiver of the vehicle M. The current position of the vehicle M may be identified or complemented by an inertial navigation system (INS) using outputs from vehicle sensors. The vehicle sensors include, for example, a vehicle speed sensor detecting a speed of the vehicle M, an acceleration sensor detecting acceleration, a yaw rate sensor detecting an angular speed about a vertical axis, and an azimuth sensor detecting an orientation of the vehicle M. The vehicle control apparatus 20 identifies position information of the vehicle M at a predetermined time interval, and stores (updates) the position information into the storage device DB. The acquirer 102 acquires the position information stored in the storage device DB at a predetermined time interval.

Acquisition of (10) Consent to Participation in V2G

When consent to participation in the V2G is acquired, the HMI displays various images on a display apparatus according to execution of an application that inquires of the occupant of the vehicle M about whether or not the vehicle M is to participate in the V2G (that is, the vehicle M interchanges electric power with the electric power system PG). In a case where the occupant of the vehicle M inputs an operation indicating the consent to participation in the V2G on the HMI according to the execution of the application, the acquirer 102 acquires information indicating the consent to participation in the V2G.

Acquisition of (11) Number of Times of Charging

The number of times of charging is counted by, for example, the vehicle control apparatus 20, and a count result is stored in the storage device DB. For example, the vehicle control apparatus 20 identifies that the traveling battery 30 is being charged on the basis of a detection result from the detector detecting a direction of a current flowing through the PCU 50 when the PCU 50 and the external power source apparatus 200 are connected to each other via the cable CB. Whenever the traveling battery 30 is identified to be being charged, the vehicle control apparatus 20 stores (updates) a value obtained by adding "1" to the number of times of charging hitherto already stored in the storage device DB, into the storage device DB as a new number of times of charging. The acquirer 102 acquires the number of times of charging stored in the storage device DB at a predetermined time interval.

Acquisition of (12) Charging Elapsed Time

A charging elapsed time is counted by, for example, the vehicle control apparatus 20. For example, the vehicle control apparatus 20 identifies that the traveling battery 30 is being charged on the basis of a detection result from the detector detecting a direction of a current flowing through the PCU 50 when the PCU 50 and the external power source apparatus 200 are connected to each other via the cable CB. The vehicle control apparatus 20 starts to count a charging elapsed time after the traveling battery 30 is identified to be being charged. The acquirer 102 acquires a value counted by the vehicle control apparatus 20 normally or at a predetermined time interval.

Acquisition of (13) Total Charging Time

A total charging time is counted by, for example, the vehicle control apparatus 20, and a count result is stored in the storage device DB. For example, whenever a count of (2) the charging time is reset to an initial value, the vehicle control apparatus 20 stores (updates) a value obtained by adding a count value to a total charging time stored in the storage device DB, into the storage device DB as a new total charging time. The acquirer 102 acquires the total charging time stored in the storage device DB, for example, at a predetermined time interval.

The communication controller 104 causes the communicator 110 to transmit vehicle information to the aggregate apparatus 500 on the basis of the pieces of information of the types of (1) to (13) acquired by the acquirer 102 and the transmission condition information 122.

FIG. 3 is a diagram showing an example of a content of the transmission condition information 122. The transmission condition information 122 is, for example, information in which a condition is correlated with the type of information that is transmitted as vehicle information to the aggregate apparatus 500 in a case where the condition is satisfied. In a case where the pieces of information of the types of (1) to (13) acquired by the acquirer 102 satisfy the condition shown in the transmission condition information 122, the communication controller 104 causes the communicator 110 to transmit the information of the type correlated with the condition to the aggregate apparatus 500 as vehicle information.

Correlation between conditions (conditions 1 to 8) and vehicle information in FIG. 3 is as follows. The condition 1 is that a predetermined time has elapsed (condition 1). Vehicle information transmitted to the aggregate apparatus 500 in a case where the (condition 1) is satisfied is (1) the VIN, (2) the charging time, (3) the discharging time, (4) the traveling time, (5) the time for linking to the V2G, and (6) the number of times of startup. The condition 2 is that the time for linking to the V2G reaches a linking limit threshold value (condition 2). Vehicle information transmitted to the aggregate apparatus 500 in a case where the (condition 2) is satisfied is (1) the VIN, (2) the charging time, (4) the traveling time, and (6) the number of times of startup. The condition 3 is that the number of times of charging reaches a threshold value for the number of times of charging (condition 3). The condition 4 is that the vehicle M participates in the V2G (condition 4). Vehicle information transmitted to the aggregate apparatus 500 in a case where the (condition 3) or the (condition 4) is satisfied is (1) the VIN, (2) the charging time, (4) the traveling time, and (6) the number of times of startup. The threshold value for the number of times of charging is an example of a "third threshold value".

The condition 5 is that a vehicle is present at a specific position (condition 5). Vehicle information transmitted to the aggregate apparatus 500 in a case where the (condition 5) is satisfied is information in which (4) the traveling time, (6) the number of times of startup, and (9) the position information are correlated with each other. The condition 6 is that a sum total of the charging time and the discharging time reaches a first threshold value (condition 6). The condition 7 is that an elapsed time from starting of charging reaches a second threshold value (condition 7). Vehicle information transmitted to the aggregate apparatus 500 in a case where the (condition 6) or the (condition 7) is satisfied is information in which (1) the VIN, (2) the charging time, and (6) the number of times of startup are correlated with each other. The condition 8 is that the vehicle is traveling (condition 8). Vehicle information transmitted to the aggregate apparatus 500 in a case where the (condition 8) is satisfied is information in which (1) the VIN, (2) the charging time, (6) the number of times of startup, and (9) the position information are correlated with each other.

Determination of (Condition 1)

The communication controller 104 determines whether or not the (condition 1) is satisfied on the basis of whether or not a predetermined time has elapsed from a timing at which the (condition 1) is previously determined as being satisfied, for example, in histories in which the (condition 1) is determined as being satisfied. In a case where the (condition 1) is satisfied on the basis of the fact that a predetermined time has elapsed from a timing at which the (condition 1) is previously determined as being satisfied, the communication controller 104 transmits vehicle information to the aggregate apparatus 500 by using the communicator 110. Among the pieces of information acquired by the acquirer 102, the vehicle information is (1) the VIN, (2) the charging time, (3) the discharging time, (4) the traveling time, (5) the time for linking to the V2G, and (6) the number of times of startup. The aggregate apparatus 500 may positively request an action related to the V2G of the vehicle M having high durability such that the quality of electric power supplied from the electric power system PG is maintained and may not request an action related to the V2G of the vehicle M having low durability such that the durability of the vehicle M does not deteriorate by recognizing the durability of a component or an apparatus mounted on the vehicle M on the basis of the vehicle information received from the vehicle M. The aggregate apparatus 500 estimates the durability on the basis of, for example, (2) the charging time, (3) the discharging time, (4) a total conduction time indicated by a sum total of the traveling time, (5) the time for linking to the V2G, and (6) the number of times of startup.

Determination of (Condition 2)

The communication controller 104 determines whether or not the (condition 2) is satisfied on the basis of whether or not, for example, (5) the time for linking to the V2G acquired by the acquirer 102 reaches a predefined linking limit threshold value. In a case where the (condition 2) is satisfied on the basis of the fact that (5) the time for linking to the V2G reaches the predefined linking limit threshold value, the communication controller 104 transmits vehicle information to the aggregate apparatus 500 by using the communicator 110. Among the pieces of information acquired by the acquirer 102, the vehicle information is (1) the VIN, (2) the charging time, (4) the traveling time, and (6) the number of times of startup. The aggregate apparatus 500 can recognize to what extent the vehicle M of which an action related to the V2G is not requested in the future uses the traveling battery 30 (that is, the extent of deterioration in the traveling battery 30) on the basis of the vehicle information received from the vehicle M. In a case where the (condition 2) is satisfied, the communication controller 104 may transmit vehicle information further including information indicating that the vehicle M indicated by the VIN does not participate in the V2G in the future.

Determination of (Condition 3)

The communication controller 104 determines whether or not the (condition 3) is satisfied on the basis of whether or not, for example, (11) the number of times of charging acquired by the acquirer 102 reaches a threshold value for the number of times of charging. In a case where the (condition 3) is satisfied on the basis of the fact that (11) the number of times of charging reaches the threshold value for the number of times of charging, the communication controller 104 transmits vehicle information to the aggregate apparatus 500 by using the communicator 110. Among the pieces of information acquired by the acquirer 102, the vehicle information is (1) the VIN, (2) the charging time, (4) the traveling time, and (6) the number of times of startup. The aggregate apparatus 500 can recognize to what extent the vehicle M of which an action related to the V2G is not requested in the future uses the traveling battery 30 (that is, the extent of deterioration in the traveling battery 30) on the basis of the vehicle information received from the vehicle M. In a case where the (condition 3) is satisfied, the communication controller 104 may transmit vehicle information further including information indicating that the vehicle M indicated by the VIN does not participate in the V2G in the future.

Determination of (Condition 4)

The communication controller 104 determines whether or not the (condition 4) is satisfied on the basis of, for example, (10) the consent to participation in the V2G acquired by the acquirer 102. In a case where the (condition 4) is satisfied on the basis of the fact that the consent to participation in the V2G is acquired by the acquirer 102, the communication controller 104 transmits vehicle information to the aggregate apparatus 500 by using the communicator 110. Among the pieces of information acquired by the acquirer 102, the vehicle information is (1) the VIN, (3) the discharging time, (5) the time for linking to the V2G, (6) the number of times of startup, (7) the vehicle SOC, and (8) the charging/discharging performance. The aggregate apparatus 500 can recognize vehicle characteristics (for example, (7) the vehicle SOC or (8) the charging/discharging performance) of the vehicle M of which an action related to the V2G is requested as necessary, on the basis of the vehicle information received from the vehicle M.

Determination of (Condition 5)

The communication controller 104 determines whether or not the (condition 5) is satisfied on the basis of, for example, (9) the position information acquired by the acquirer 102. In a case where the (condition 5) is satisfied on the basis of the fact that a position indicated by (9) the position information matches a specific position, the communication controller 104 transmits vehicle information to the aggregate apparatus 500 by using the communicator 110. Among the pieces of information acquired by the acquirer 102, the vehicle information is (4) the traveling time, (6) the number of times of startup, and (9) the position information. The aggregate apparatus 500 can recognize the vehicle M that is present at a position of a distribution system in which the quality of electric power is required to be maintained through interchange of electric power using the V2G in the electric power system PG, the vehicle M being a vehicle of which an action related to the V2G is requested, on the basis of the vehicle information received from the vehicle M.

Determination of (Condition 6)

The communication controller 104 determines whether or not the (condition 6) is satisfied on the basis of, for example, (2) the charging time and (3) the discharging time acquired by the acquirer 102. In a case where the (condition 6) is satisfied on the basis of the fact that a sum total of (2) the charging time and (3) the discharging time that are acquired reaches the first threshold value, the communication controller 104 transmits vehicle information to the aggregate apparatus 500 by using the communicator 110. Among the pieces of information acquired by the acquirer 102, the vehicle information is (1) the VIN, (2) the charging time, and (6) the number of times of startup. Here, it is estimated that the vehicle M satisfying the (condition 6) is in a state of the traveling battery 30 not being appropriate for participating in the V2G. The state of the traveling battery 30 not being appropriate for participating in the V2G is, for example, a state in which deterioration in the traveling battery 30 progresses temporarily or permanently. The aggregate apparatus 500 does not request an action related to the V2G of the vehicle M of which the traveling battery 30 deteriorates on the basis of the received vehicle information such that deterioration in the traveling battery 30 of the vehicle M can be prevented from progressing. In a case where the vehicle information is transmitted to the aggregate apparatus 500 on the basis of the fact that the (condition 6) is satisfied, the communication controller 104 resets (sets) each of counts of the charging time and the discharging time stored in the storage device DB to an initial value (for example, "0").

Determination of (Condition 7)

The communication controller 104 determines whether or not the (condition 7) is satisfied on the basis of, for example, (12) the charging elapsed time acquired by the acquirer 102. In a case where the (condition 7) is satisfied on the basis of the fact that (12) the charging elapsed time that is acquired reaches the second threshold value, the communication controller 104 transmits vehicle information to the aggregate apparatus 500 by using the communicator 110. Among the pieces of information acquired by the acquirer 102, the vehicle information is (1) the VIN, (2) the charging time, and (6) the number of times of startup. Here, it is estimated that the vehicle M satisfying the (condition 7) is in a state of the traveling battery 30 not being appropriate for participating in the V2G. An effect achieved by the aggregate apparatus 500 recognizing the vehicle M satisfying the (condition 7) is the same as that in the (condition 6), and thus a description thereof will not be repeated.

Determination of (Condition 8)

The communication controller 104 determines whether or not the (condition 8) is satisfied on the basis of, for example, a detection result acquired by the acquirer 102, the detection result being output from the detector detecting whether or not the drive wheels of the vehicle M are being driven. In a case where the (condition 8) is satisfied on the basis of the fact that the acquired detection result indicates that the drive wheels are being driven (that is, the vehicle M is traveling), the communication controller 104 transmits vehicle information to the aggregate apparatus 500 by using the communicator 110. Among the pieces of information acquired by the acquirer 102, the vehicle information is (1) the VIN, (2) the charging time, (6) the number of times of startup, and (9) the position information. The aggregate apparatus 500 recognizes information regarding the vehicle M that is currently traveling on the basis of the vehicle information received from the vehicle M, and can thus recognize the vehicle M (that is, a vehicle that is not traveling) of which an action related to the V2G is requested or the vehicle M (that is, a vehicle that is traveling) of which an action related to the V2G is not requested. The communication controller 104 may perform only one process of transmitting vehicle information related to the (condition 8) being satisfied until the ignition is turned off from turning-on of the ignition.

The communication controller 104 does not transmit (prohibits transmission of) vehicle information to the aggregate apparatus 500 by using the communicator 110 on the basis of the pieces of information of the types of (1) to (13) acquired by the acquirer 102 and the transmission prohibition condition information 124.

FIG. 4 is a diagram showing an example of a content of the transmission prohibition condition information 124. The transmission prohibition condition information 124 is, for example, information indicating a condition (hereinafter, a prohibition condition) in which vehicle information is prohibited from being transmitted to the aggregate apparatus 500 in a case where the condition is satisfied. In FIG. 4, the prohibition condition is that a sum total of the charging time (that is, a total charging time) is not equal to or less than a chargeable time of the traveling battery (condition 9).

Determination of (Condition 9)

The communication controller 104 determines whether or not the (condition 9) is satisfied on the basis of whether or not, for example, (13) the total charging time acquired by the acquirer 102 is equal to or less than a chargeable time of the traveling battery 30. In a case where the (condition 9) is satisfied on the basis of the fact that (13) the total charging time is not equal to or less than the chargeable time of the traveling battery 30, the communication controller 104 does not transmit (prohibits transmission of) vehicle information that is information acquired by the acquirer 102 to the aggregate apparatus 500 by using the communicator 110. Consequently, the aggregate apparatus 500 cannot receive vehicle information regarding the vehicle M, and thus does not request an action related to the V2G of the vehicle M, so that deterioration in the traveling battery 30 of the vehicle M can be prevented from progressing.

Operation Flow

Figure 5:
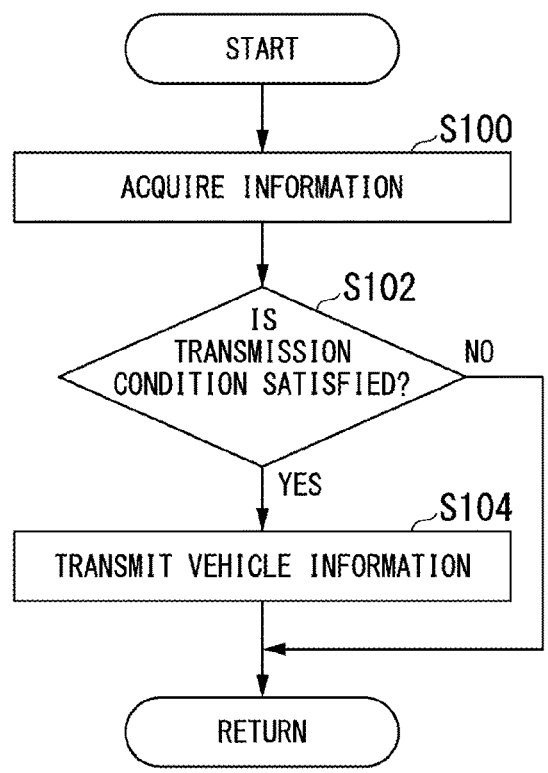
FIG. 5 is a flowchart showing an example of a series of operations of the information processing apparatus related to a vehicle information transmission process.

FIG. 5 is a flowchart showing an example of a series of operations of the information processing apparatus 10 related to a vehicle information transmission process. The flowchart of FIG. 5 is repeatedly executed at predetermined time intervals. First, the acquirer 102 acquires the pieces of information of the types of (1) to (13) (step S100). The communication controller 104 determines whether or not one or more conditions are satisfied among the conditions shown in the transmission condition information 122 on the basis of the information acquired by the acquirer 102 (step S102). In a case where none of the conditions are satisfied, the communication controller 104 finishes the process. In a case where it is determined that the conditions are satisfied, the communication controller 104 causes the communicator 110 to transmit vehicle information to the aggregate apparatus 500 (step S104). The vehicle information is information correlated with the conditions in the transmission condition information 122 among the pieces of information of the types of (1) to (13).

Figure 6:
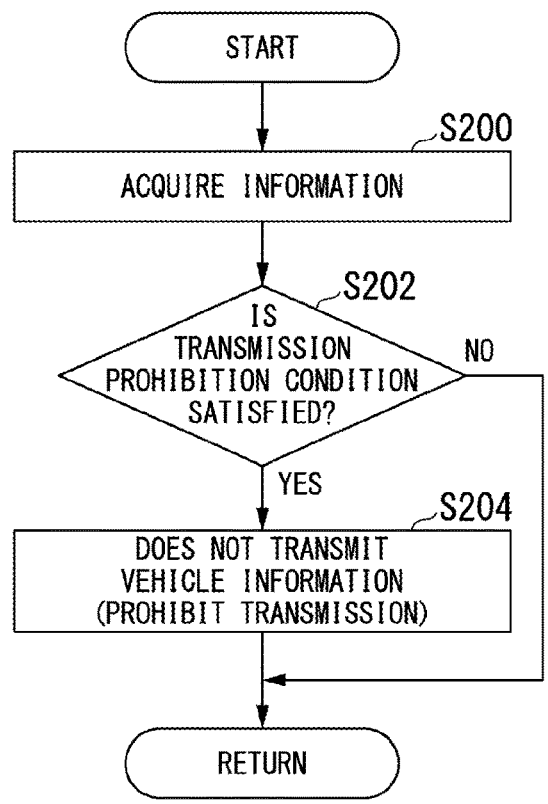
FIG. 6 is a flowchart showing an example of a series of operations of the information processing apparatus related to a vehicle information transmission prohibition process.

FIG. 6 is a flowchart showing an example of a series of operations of the information processing apparatus 10 related to a vehicle information transmission prohibition process. The flowchart of FIG. 6 is repeatedly executed at predetermined time intervals. First, the acquirer 102 acquires the pieces of information of the types of (1) to (13) (step S200). The communication controller 104 determines whether or not one or more prohibition conditions are satisfied among the conditions shown in the transmission prohibition condition information 124 on the basis of the information acquired by the acquirer 102 (step S202). In a case where none of the prohibition conditions are satisfied, the communication controller 104 finishes the process. In a case where it is determined that the prohibition conditions are satisfied, the communication controller 104 does not transmit (prohibits transmission of) vehicle information to the aggregate apparatus 500 by using the communicator 110 (step S204).

Summary of Embodiment

As described above, in a case where a condition shown in the transmission condition information 122 is satisfied, the information processing apparatus 10 of the present embodiment causes the communicator 110 to transmit information of the type associated with the condition to the aggregate apparatus 500 as vehicle information, and thus it is possible to prevent a network from being overloaded due to communication related to charging and discharging of the traveling battery.

Instruction for Action Related to V2G

In the above description, a description has been made of a case where the aggregate apparatus 500 gives an instruction for an action related to the V2G to the external power source apparatus 200 or the vehicle M, but this is only an example. The aggregate apparatus 500 may determine an action requested of the external power source apparatus 200 or the vehicle M, and may provide a determination result to an external apparatus. In this case, the external apparatus gives an instruction for an action to the external power source apparatus 200 or the vehicle M. The external apparatus may be, for example, a server apparatus provided in an electric company (including a power transmission and distribution company or a retail electric company).

Acquisition Timing of Information of Each Type

The acquirer 102 may first acquire information used to determine whether or not any conditions such as the (condition 1) to the (condition 9) are satisfied, and may acquire information correlated with a condition among the pieces of information of the types of (1) to (13) in a case where the condition is satisfied. The information used to determine whether or not any conditions such as the (condition 1) to the (condition 9) are satisfied may be as follows, for example.

(Condition 1); a timing at which the (condition 1) is previously satisfied (Condition 2); (5) the time for linking to the V2G (Condition 3); (11) the number of times of charging (Condition 4); (10) the consent to participation in the V2G (Condition 5); (9) the position information (Condition 6); (2) the charging time and (3) the discharging time (Condition 7); (12) the charging elapsed time (Condition 8); a detection result of detecting whether the vehicle M is traveling (Condition 9); (12) the charging elapsed time While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information processing apparatus comprising:
   an acquirer that is configured to acquire information regarding charging and discharging of a traveling battery provided in a vehicle with respect to an electric power system; and
   a communication controller that is configured to cause a communicator mounted on the vehicle to transmit the information acquired by the acquirer to a server apparatus in a case where a predefined condition associated with a type of the information is satisfied,
   wherein the information acquired by the acquirer includes a first total time and a second total time,
   the first total time is a sum of discharge time in which the travelling battery discharges power to an external power source apparatus as the traveling battery is connected to the external power source apparatus,
   the second total time is a sum of charge time in which the travelling battery charges power supplied by the external power source apparatus as the traveling battery is connected to the external power source apparatus,
   the communication controller;
   determines whether a sum of the first total time and the second total time reaches a first threshold value or not,
   does not cause the communicator to transmit a vehicle identification number of the vehicle and the second total time to the server apparatus in a case where the sum of the first total time and the second total time does not reach the first threshold value,
   cause the communicator to transmit the vehicle identification number and the second total time to the server apparatus in a case where the sum of the first total time and the second total time reaches the first threshold value,
   the travelling battery deteriorates as the sum of the first total time and the second total time increases, and
   the first threshold value is a value which is estimated to indicate that a degree of deterioration of the traveling battery is equal to or greater than a reference value.

2. The information processing apparatus according to claim 1,
   wherein the predefined condition for a discharging time and a charging time that are the types of the information involves satisfying at least one of a sum total of the discharging time for which the traveling battery releases electric power to the electric power system and the charging time for which the traveling battery is charged with electric power from the electric power system reaching the first threshold value, and an elapsed time after the traveling battery starts to be charged with electric power from the electric power system reaching a second threshold value.

3. The information processing apparatus according to claim 1,
   wherein the predefined condition for a number of times of charging of the traveling battery that is the type of the information is that the number of times reaches a third threshold value.

4. The information processing apparatus according to claim 1,
   wherein the communication controller is configured to set values of a discharging time and a charging time to initial values in a case where the communicator is caused to transmit the information on the basis of the fact of satisfying a condition that a sum total of the discharging time for which the traveling battery releases electric power to the electric power system and the charging time for which the traveling battery is charged with electric power from the electric power system reaches the first threshold value.

5. The information processing apparatus according to claim 1,
   wherein the predefined condition for a charging time that is the type of the information is that a sum total of the charging time is equal to or less than a chargeable time of the traveling battery, and
   wherein the communication controller is configured to cause the communicator not to transmit the information in a case where a condition that the sum total is equal to or less than the chargeable time of the traveling battery is not satisfied.

6. The information processing apparatus according to claim 1,
   wherein the type of the information transmitted to the server apparatus by the communication controller in a case where a condition is satisfied differs depending on each satisfied condition.

7. An information processing method of causing a computer to:
   acquire information regarding charging and discharging of a traveling battery provided in a vehicle with respect to an electric power system; and
   transmit the information to a server apparatus by using a communicator mounted on the vehicle in a case where a predefined condition associated with a type of the information is satisfied,
   wherein the information includes a first total time and a second total time,
   the first total time is a sum of discharge time in which the travelling battery discharges power to an external power source apparatus as the traveling battery is connected to the external power source apparatus,
   the second total time is a sum of charge time in which the travelling battery charges power supplied by the external power source apparatus as the traveling battery is connected to the external power source apparatus, wherein the information processing method further causes the computer to:
determine whether a sum of the first total time and the second total time reaches a first threshold value or not,
not cause the communicator to transmit a vehicle identification number of the vehicle and the second total time to the server apparatus in a case where the sum of the first total time and the second total time does not reach the first threshold value,
cause the communicator to transmit the vehicle identification number and the second total time to the server apparatus in a case where the sum of the first total time and the second total time reaches the first threshold value,
the travelling battery deteriorates as the sum of the first total time and the second total time increases, and
the first threshold value is a value which is estimated to indicate that a degree of deterioration of the traveling battery is equal to or greater than a reference value.

8. A storage medium storing a program causing a computer to:
acquire information regarding charging and discharging of a traveling battery provided in a vehicle with respect to an electric power system; and
transmit the information to a server apparatus by using a communicator mounted on the vehicle in a case where a predefined condition associated with a type of the information is satisfied,
wherein the information includes a first total time and a second total time,
the first total time is a sum of discharge time in which the travelling battery discharges power to an external power source apparatus as the traveling battery is connected to the external power source apparatus,
the second total time is a sum of charge time in which the travelling battery charges power supplied by the external power source apparatus as the traveling battery is connected to the external power source apparatus,
wherein the program further causes the computer to:
determine whether a sum of the first total time and the second total time reaches a first threshold value or not,
not cause the communicator to transmit a vehicle identification number of the vehicle and the second total time to the server apparatus in a case where the sum of the first total time and the second total time does not reach the first threshold value,
cause the communicator to transmit the vehicle identification number and the second total time to the server apparatus in a case where the sum of the first total time and the second total time reaches the first threshold value,
the travelling battery deteriorates as the sum of the first total time and the second total time increases, and
the first threshold value is a value which is estimated to indicate that a degree of deterioration of the traveling battery is equal to or greater than a reference value.

* * * * *